(12) United States Patent
Faist et al.

(10) Patent No.: US 8,567,587 B2
(45) Date of Patent: Oct. 29, 2013

(54) MATRIX CONVEYOR FOR USE AS A SORTING DEVICE OR PALLETIZING DEVICE

(71) Applicant: SSI Schäfer Noel GMBH Lager-Und Systemtechnik, Giebelstadt (DE)

(72) Inventors: Bernd Faist, Ochsenfurt (DE); Axel Müller, Kirchheim (DE)

(73) Assignee: SSI Schaefer Noell GmbH Lager—und Systemtechnik, Giebelstadt (DE)

( * ) Notice: Subject to any disclaimer, the term of this patent is extended or adjusted under 35 U.S.C. 154(b) by 0 days.

(21) Appl. No.: 13/856,754

(22) Filed: Apr. 4, 2013

(65) Prior Publication Data

US 2013/0220775 A1 Aug. 29, 2013

Related U.S. Application Data

(63) Continuation of application No. 13/655,887, filed on Oct. 19, 2012, now abandoned, which is a continuation of application No. PCT/EP2011/055985, filed on Apr. 15, 2011.

(30) Foreign Application Priority Data

Apr. 19, 2010 (DE) .......................... 10 2010 015 584

(51) Int. Cl.
*B65G 47/34* (2006.01)
(52) U.S. Cl.
USPC .................................................. 198/370.09
(58) Field of Classification Search
USPC ..................... 198/370.09, 371.3; 193/35 MD
See application file for complete search history.

(56) References Cited

U.S. PATENT DOCUMENTS 3,645,379 A * 2/1972 Kornylak ................. 198/370.09
3,710,917 A * 1/1973 Black et al. .............. 198/370.09

(Continued)

FOREIGN PATENT DOCUMENTS

DE 19927251 1/2001
DE 112005001095 6/2007

(Continued)

OTHER PUBLICATIONS

International Search Report for PCT/EP2011/055985.

*Primary Examiner* — Gene Crawford
*Assistant Examiner* — Keith Campbell
(74) *Attorney, Agent, or Firm* — Renner, Otto, Boisselle & Sklar, LLP (57) ABSTRACT

It is disclosed a matrix conveyor (10) comprising: a plurality of individual roller modules (28), wherein respectively one roller module (28) is arranged at each point of intersection of a regular grid-shaped structure (68), and wherein the roller modules (28) commonly define a conveying plane (30), which is substantially planar, for transporting a conveying good (72) thereon; and a superordinated control device (12) being adapted to individually control each of the individual roller modules (28) so that the conveying good (72) can be transported along a path (74), which can be planned in advance, wherein a shape of the path (74) is defined by a plurality of overlaps of at least two basic conveying directions (60, 62) of the conveying plane (30); wherein the at least two basic conveying directions (60, 62) geometrically span the conveying plane (30), and wherein each of the roller modules (64) is drivable in only one of the at least two basic conveying directions (60), wherein directly adjacent roller modules (66) are respectively drivable in the other one of the at least two basic conveying directions (62).

15 Claims, 6 Drawing Sheets

(56) References Cited

U.S. PATENT DOCUMENTS

| | | | |
|---|---|---|---|
| 5,246,096 A | 9/1993 | Terpstra | |
| 5,261,526 A * | 11/1993 | Rombouts | 198/789 |
| 5,396,977 A * | 3/1995 | Lantis et al. | 198/371.3 |
| 5,868,238 A * | 2/1999 | Bonnet | 198/370.1 |
| 6,223,880 B1 * | 5/2001 | Caspi et al. | 198/346.2 |
| 6,340,083 B1 * | 1/2002 | Zhou et al. | 198/370.09 |
| 6,382,393 B2 * | 5/2002 | Itoh et al. | 198/370.09 |
| 6,694,220 B1 * | 2/2004 | Tanz | 700/226 |
| 6,871,823 B2 * | 3/2005 | Roberts | 244/137.1 |
| 7,090,067 B2 * | 8/2006 | Schiesser et al. | 198/395 |
| 7,233,840 B2 * | 6/2007 | Schiesser et al. | 700/230 |
| 7,735,781 B1 * | 6/2010 | Moritz et al. | 244/137.1 |
| 2003/0141165 A1 | 7/2003 | Reznik | |
| 2005/0107911 A1 | 5/2005 | Wynblatt | |
| 2007/0288122 A1 | 12/2007 | Wynblatt | |
| 2011/0022221 A1 * | 1/2011 | Fourney | 700/230 |

FOREIGN PATENT DOCUMENTS

| | | |
|---|---|---|
| EP | 0563824 | 10/1993 |
| EP | 1375389 | 1/2004 |
| FR | 2798122 | 3/2001 |
| GB | 2259900 | 3/1993 |

* cited by examiner

MATRIX CONVEYOR FOR USE AS A SORTING DEVICE OR PALLETIZING DEVICE

RELATED APPLICATIONS

This is a continuation application of U.S. application Ser. No. 13/655,887 filed Oct. 19, 2012, which is a continuation of International Application No. PCT/EP2011/055985 filed Apr. 15, 2011, which claims priority of German Application No. 10 2010 015 584.5 filed on Apr. 19, 2010, these applications being fully incorporated herein by reference.

BACKGROUND OF THE INVENTION

The present invention relates to a matrix conveyor which can be used in a manifold manner such as for (steadily) conveying, sorting, orientating, picking, palletizing or forming layers of loads, distributing, and similar actions.

RELATED PRIOR ART

Known prior art devices such as inclined roller conveyors, lifting rotation stations, or sword rotation stations have partially similar functions.

The article entitled "Flexibler Materialfluss auch bei hoher Auslastung" published in "LOGISTIK für Unternehmen", Vol. 1/2-2010, pages 52 ff. discloses a material flow conveyor transporting the conveying goods by means of slide conveyance. The conveyor, designated as "WAVE", comprises a horizontal conveying membrane beneath which a plurality of vertically actuable lifting pins are arranged along a regular structure (grid). The lifting pins can be deflected temporarily up or down perpendicularly, thereby allowing deformation of the conveying membrane. In this manner (membrane) mountains or valleys can be generated, which can be moved and rotated selectively by means of a control device. A moving conveying membrane mountain runs like a wave through the membrane and pushes in this manner a conveying good in front thereof, assuming that the slide characteristics (conveying good—membrane) are selected correspondingly.

The described wave conveyor represents a test run of the Universität of Hamburg, which has not yet gone into production up to now. One problem seemingly is the high adhesive friction between the conveying membrane and the conveying goods. For allowing pushing of the conveying good safely in front of one conveying membrane wave, lifting pins need to be extracted and retracted correspondingly high and deep. Thereby, the conveying membrane can be stressed extraordinarily strong so that lifetime is expected to be small due to a high risk of wear. If the material thickness of the-conveying membrane is increased for increasing the lifetime, the flexibility and the sensitivity is decreased in a disadvantageous manner so that the conveying goods become worse steerable.

Conveying velocity is limited by a control velocity of the lifting pins. The WAVE system is inert.

The control is complex and requires a high degree of synchronization since the lifting and lowering movements of the lifting pins need to be adapted to each other while the wave formed by the conveying membrane continues. Otherwise the wave does not run continuously through the conveying membrane.

Another disadvantage is to be seen in that the number of conveying goods, which can be moved simultaneously on the conveying membrane, is very low since the conveying membrane can only be deflected in a finite manner. This means with other words that neighbouring conveying goods need to be sufficiently distanced to each other so that the conveying membrane does not lift one of the conveying goods being located between two wave mountains. If the conveying membrane mountains are arranged too close to each other, the conveying membrane lifts automatically between the wave mountains. This is particularly true since a height of one of the wave mountains must be significantly higher than a height of the to-be-transported conveying good. Otherwise the wave passes beneath the conveying good.

Further, it is a disadvantage that the wave conveyor does not allow rotation of one of the conveying goods at one and the same spot. The operational principle of the slide conveyance of the wave conveyor always requires movement of the conveying goods by pushing or pulling by means of the conveying membrane. Therefore, the wave conveyor is less suitable for orientating, sorting and forming predefined load arrangements of conveying goods (such as pallet layers).

The European patent application 0 563 824 A2 discloses a storage system which can consist of several planes being arranged on top of each other. Each of the storage planes comprises a plurality of conveying modules having a square base area. Each of the conveying modules comprises rollers which can cause movement of one of the conveying goods in a longitudinal or transversal direction.

The U.S. Pat. No. 5,246,096 discloses a rotation/translation-conveying module which can be used in particular at intersections of conveyor lines.

The document DE 11 2005 001 095 T5 discloses an arrangement and a method for the relative control of load-moving actuators.

The patent DE 199 27 251 C2 discloses a device for handling piece goods which are fed and discharged side-by-side and/or one after the other by means of transport means in a lying manner, the device comprising at least one entrance, at least one exit and at least one image-processing device for detecting handling information, which classifies the piece goods, based on the recorded images of the piece goods, wherein several conveying means, which are arranged in an array within one plane, are provided which can move the piece goods 1 in one plane along four directions being orientated perpendicular to each other, wherein each of the piece goods within the array area is always located on at least three conveying means, wherein at least one control device is provided for independently controlling each individual one of the conveying means, at least with regard to one conveying direction and one conveying period, for moving the piece goods 1 in a collision-free manner in accordance with the current handling schedule, which assigns the to-be executed handling actions to the handling information of the piece goods 1, wherein position and location of each classified piece good are determined online by tracking the coded images or layouts by means of the image-processing device and/or additional sensor devices.

SUMMARY OF THE INVENTION

Therefore, it is an object of the present invention to provide a multifunctional conveyor overcoming the above-mentioned disadvantages. This object is solved by matrix conveyor comprising: a regular grid-shaped structure have a plurality of points of intersections; a plurality of individual roller modules, wherein respectively one of the individual roller module is arranged at each of the points of intersection of the regular grid-shaped structure, and wherein the individual roller modules commonly define a conveying plane, which is substantially planar, for transporting conveying goods thereon; and a control device being adapted to individually control each of the individual roller modules so that the conveying goods are transported along a path, which is planned in advance, wherein a shape of the path is defined by a plurality of overlaps of at least two basic conveying directions geometrically spanning the conveying plane; wherein each of the individual roller modules has at least one all-side wheel and is drivable in only one of the at least two basic conveying directions, wherein directly adjacent ones of the individual roller modules are respectively drivable in another one of the at least two basic conveying directions According to another aspect of the invention a matrix conveyor comprises: a plurality of individual roller modules, wherein respectively one roller module is arranged at each point of intersection of a regular rid-shaped structure, and wherein the roller modules commonly define a conveying plane, which is substantially planar, for transporting a conveying good thereon; and a superordinated control device being adapted to individually control each of the individual roller modules so that the conveying good can be transported along a path, which can be planned in advance, wherein a shape of the path is defined by a plurality of overlaps of at least two basic conveying directions of the conveying plane wherein the at least two basic conveying directions span the conveying plane geometrically, and wherein each of the roller modules is drivable in only one of the at least two basic conveying directions, wherein directly adjacent roller modules are respectively drivable in the other of the at least two basic conveying directions.

In particular, rotational movements of one of the conveying goods "at one and the same spot" can be performed by means of the above-described matrix conveyor of the invention which can be scaled freely. This predestines the use of the matrix conveyor in particular with sorting and orienting tasks, as they can occur, for example, during generation of one layer for loading a load carrier (such as a Europool pallet).

Arbitrarily many conveying goods can be handled simultaneously dependent on the dimensions of the matrix conveyor and the respective conveying goods. The distances between neighbouring conveying goods can be reduced to zero. The length of one of the conveying goods along a current conveying direction is irrelevant. The conveying goods can always be transported along the desired conveying direction independent of their lengths. The movement of the conveying goods within the conveying plane, which is caused by the roller modules, happens immediately when the roller modules are operated. Thus, no delay is generated between the response of the roller modules and the actual movement of the conveying goods in the conveying plane.

The movement of the conveying goods and the start of movement of the conveying goods are almost independent of the weight of the conveying goods and the consistence of the surface. Even conveying goods having a very small weight can be moved instantaneously and without any problem by means of the roller modules.

The conveying goods which have a surface with a high adhesive frictional coefficient can be moved exceptionally well by means of the roller modules since the rollers are frictionally connected to the surface of the conveying goods thereby preventing slip.

Operation of roller modules beneath one of the conveying goods does not have any effect on other conveying goods being located outside a region where the operated roller modules are arranged. Thereby, for example, the conveying goods can overtake each other on directly neighbouring conveying paths, which are arranged in parallel, without causing path interferences due to the overtaking process.

With a particular embodiment the matrix conveyor further comprises a frame, wherein each of the roller modules is arranged in a rotationally fixed manner relative to the frame, so that a respective basic conveying direction thereof cannot be changed.

Thus, the roller modules are arranged rigidly relative to the frame. This facilitates the control since merely two degrees of freedom (longitudinal and transversal) exist ideally, the control mapping the desired paths of the conveying goods.

Further, it is advantageous if each of the roller modules comprises a separate drive unit, and preferably a separate module control device.

By providing a separate drive unit it is possible to control neighbouring roller modules, which have the same basic conveying direction, at different velocities and/or accelerations. The different control, in particular, allows rotational movements of the conveying goods without slip. Particularly, during curve travels or rotation at one and the same spot it is necessary that the roller modules, which are arranged radially at the inside relative to the conveying good path operate at a smaller velocity than roller modules which are arranged radially at the outside, since the conveyor goods typically comprise a certain geometrical size and a corresponding base area. The actuating elements (roller modules) of the matrix conveyor can be operated differently at the same time.

If each of the roller modules comprises a separate module control, the superordinated control device can be operated in a decentralized manner. The superordinated control device merely outputs tasks to the module controls, being arranged hierarchically lower, which in turn take care of keeping a temporal sequence of the conveying velocities which can change dependent on time.

With a preferred embodiment the superordinated control device controls the roller modules by means of a control matrix, wherein each of the roller modules has assigned, preferably exactly one, matrix element and wherein each of the matrix elements can be determined uniquely by a location of the respectively assigned roller module in the grid-shaped structure, conveying velocity, acceleration, lift, and/or time.

The closer parameters can be set at each of the roller modules, the more dimensions the control matrix has. If only (time independent) velocities are recorded in the control matrix, then a two-dimensional control matrix having matrix elements $a_{ij}$ is sufficient, wherein the value of the matrix element corresponds to a velocity, the sign character corresponds to a conveying direction, and the indices i and j correspond to the coordinates within the conveying plane. If the velocity additionally changes over time, a third dimension is introduced for the time. If the roller modules, for example, can be additionally lifted and lowered, the lift can be added as another dimension. Similar is true if an acceleration is considered. Additional dimensions are possible.

Further, it is advantageous if a conveying velocity of each of the roller modules can be set stepless and temporarily changeable.

Accelerations become possible due to the stepless setability. The accelerations allow, for example, overtaking processes or rotational movements on the matrix conveyor.

The temporal changeability allows the simultaneous handling of several conveying goods on the matrix conveyor. If one of the roller modules, for example, conveys at a low velocity during a first time interval for advancing a first conveying good, then the same roller module can be moved during a subsequent second time interval, for example, at a greater conveying velocity allowing one of the conveying goods located upstream catching up with the first handled conveying good (accumulation conveyer, slug generation, closing of gaps, etc.). According to still another aspect of the invention a palletizing device for stacking loading goods on a load carrier, wherein the loading goods may have respectively different dimensions and may be formed differently, comprises: a matrix conveyor which comprises: a regular grid-shaped structure have a plurality of points of intersections; a plurality of individual roller modules, wherein respectively one of the individual roller module is arranged at each of the points of intersection of the regular grid-shaped structure, and wherein the individual roller modules commonly define a conveying plane, which is substantially planar, for transporting conveying goods thereon; and a control device being adapted to individually control each of the individual roller modules so that the conveying goods are transported along a path, which is planned in advance, wherein a shape of the path is defined by a plurality of overlaps of at least two basic conveying directions geometrically spanning the conveying plane; wherein each of the individual roller modules has at least one all-side wheel and is drivable in only one of the at least two basic conveying directions, wherein directly adjacent ones of the individual roller modules are respectively drivable in the other one of the at least two basic conveying directions; one or more feeding conveyors, wherein each of the feeding conveyors is connected in a conveying manner to the matrix conveyor; and a loading station being arranged laterally adjacent to one side of the matrix conveyor so that the loading goods, which have been collected on the matrix conveyor for forming one layer, are transferred to a provided load carrier; wherein the control device of the matrix conveyor is adapted to transport each of the loading goods from one of the feeding conveyors along the path, being specifically planned in advance, to a destination, which has been planned in advance, within the layer.

Still another aspect of the invention is defined by a sorting device for sorting conveying goods in accordance with a predefined sequence by use of the matrix conveyor in accordance with one of the claims 1 to 8, wherein the superordinated control device is adjusted to bring the conveying goods, which are given on the conveying plane in a chaotic sequence, into the predefined sequence by planning in advance an individual path for each of the conveying goods, wherein the path is designed such that the conveying goods leave the conveying plane in accordance with the predefined sequence.

With a particular embodiment exactly two, preferably perpendicular oriented, basic conveying directions are defined so that the roller modules are arranged and operated along a regular rectangular grid.

This facilitates the mechanical structure of the matrix conveyor as well as driving the roller modules. The conveying paths of the conveying goods on the matrix conveyor are calculated easily so that the control effort stays manageable.

In particular, each of the roller modules is of the same type.

This facilitates stockage of spare parts as well as maintenance and upkeep works.

In addition, it has been proven good if each of the roller modules comprises at least one all-side wheel, a drive, a shaft, a force transmission unit, and/or a support.

All-side wheels have the advantage that they can be used for transporting the conveying goods along one direction (preferably along one of the basic conveying directions) allowing an almost frictionless passage of one of the conveying goods at the same time along a direction which is oriented perpendicularly thereto (preferably along the other basic conveying direction).

Matrix conveyor of the invention can be used, amongst other things, in a palletizing device for loading a load carrier with differently sized and shaped loading goods, wherein the palletizing device further comprises: one or more feeding conveyors, wherein each of the feeding conveyors is coupled in a conveying manner, preferably at another side, to the matrix conveyor; and a loading station which is arranged adjacent to one of the sides of the matrix conveyor so that loading goods, which are collected for generating one layer on the matrix conveyor, can be transferred to a provided load carrier, preferably by means of the matrix conveyor itself; wherein the superordinated control device of the matrix conveyor is adapted to transport each of the loading goods along a path, which is specifically planned in advance, from one of the feeding conveyors to a location within the layer, which has been planned in advance.

In particular, the superordinated control device of the matrix conveyor rotates one of the loading goods, while moving same to its planned-in-advance location along its planned-in-advance path, additionally about an axis perpendicular to the conveying plane.

Further, it is advantageous if the conveying plane of the matrix conveyor is greater, preferably at least double in size, than a loading area of the load carrier which is to be loaded.

In this manner it is ensured that the conveying plane of the matrix conveyor provides sufficient space for manipulating conveying goods and loading goods, which have been fed, so that the sum of the loading goods can be moved to form one layer of loading goods, which can be transferred to the load carrier subsequently.

In addition, a sorting device for sorting conveying goods in accordance with a predetermined sequence by means of the matrix conveyor of the invention is proposed, wherein the superordinated control device is adapted to bring the conveying goods, which are given on the conveying plane in a chaotic sequence, into a predetermined sequence by planning in advance an individual path for each of the conveying goods, the path being formed so that the conveying goods exit the conveying plane in accordance with the predetermined sequence.

In particular, at least one feeding conveyor and at least one discharging conveyor are coupled in a conveying manner to the matrix conveyor, and the superordinated control device is adapted to transport conveying goods, which have been fed chaotically on the conveying plane, to one of the discharging conveyors in accordance with their respectively-planned in advance paths, the one discharging conveyor being assigned to the respective conveying good.

BRIEF DESCRIPTION OF THE DRAWINGS

It is clear that the above-mentioned and hereinafter still to be explained features cannot only be used in the respectively given combination but also in other combinations or alone without departing from the scope of the present invention.

Embodiments of the invention are illustrated in the drawings and will be explained in more detail in the description below.

PREFERRED EMBODIMENTS OF THE INVENTION

In the following description of the figures like elements are designated by the same reference numerals. Similar elements will be designated by similar reference numerals. If one of the already described elements is varied, it will be mentioned explicitly.

Figure 1:
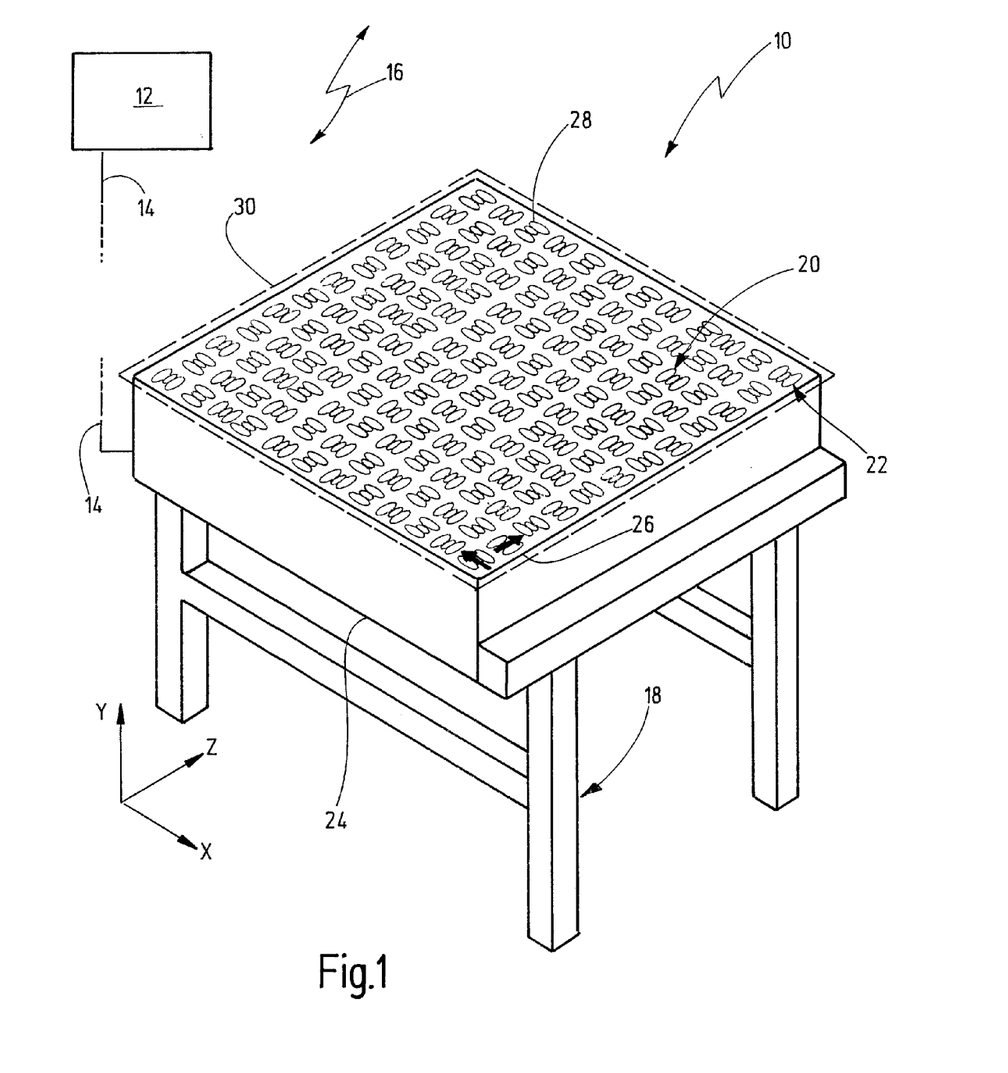
FIG. 1 shows a perspective view of a matrix conveyor of the invention.

FIG. 1 shows a perspective view of a matrix conveyor 10 in accordance with the present invention.

The matrix conveyor 10 can be used in a conveying system, for example, for automating storage and picking systems. The matrix conveyor 10 is connected in a controlling manner to a superordinated control device 12 such as a warehouse management computer, material flow computer or the like, either wired physically by means of signal lines 14 or in a wireless manner (e.g., by means of WLAN), as indicated by means of a double arrow 16.

The matrix conveyor 10 comprises a frame 18 for supporting an array, or an arrangement, of individual conveying elements 22 which are formed modularly. The individual conveying elements 22 are fit in openings in a top side 26 of an optional housing 24, the openings not being designated in more detail, and tower the top side 26 slightly. In practice, the individual conveying elements 22 are roller modules 28 which will be described below in more detail with reference to the FIGS. 2A through 2C.

The roller modules 28, which protrude from the top side 26, substantially define a planar conveying plane 30. It is clear that not all of the vertices of the roller modules 28 are lying exactly in the conveying plane 30 due to, for example, installation tolerances. However, they preferably define a planar plane indicated in FIG. 1 by means of a broken line. The conveying plane 30 does not need to be orientated necessarily in a horizontal orientation, as indicated in FIG. 1. The conveying plane 30 can also be arranged obliquely relative to a horizontal line for overcoming obstacles.

In FIG. 1 the matrix conveyor 10 is equipped exemplarily with 144 roller modules 28 which are arranged in shape of a regular grid-shaped structure comprising twelve columns and twelve rows. In this case, the roller modules 28 are arranged exemplarily along two basic conveying directions which are orientated perpendicularly in FIG. 1 and which are illustrated by means of two dark arrows in the left lower corner of the conveying plane 30. Directly neighbouring roller modules 28 convey along, preferably, different basic conveying directions as will be described in more detail with reference to FIG. 3.

The matrix conveyor 10 shown in FIG. 1, for example, has a length of 680 mm, a width of about 770 mm and a height of about 720 mm. The roller modules which are arranged in shape of a 12×12 matrix in this case have a respective geometrical size of, for example, 50 mm×50 mm×110 mm (W×L×H).

It is clear that both the matrix conveyor 10 and the roller modules 28 can have other dimensions, in particular more or less rows and more or less columns can be provided. Also, more than two basic conveying directions can be implemented as will be described exemplarily with reference to FIG. 11.

Figures 2A, 2B:
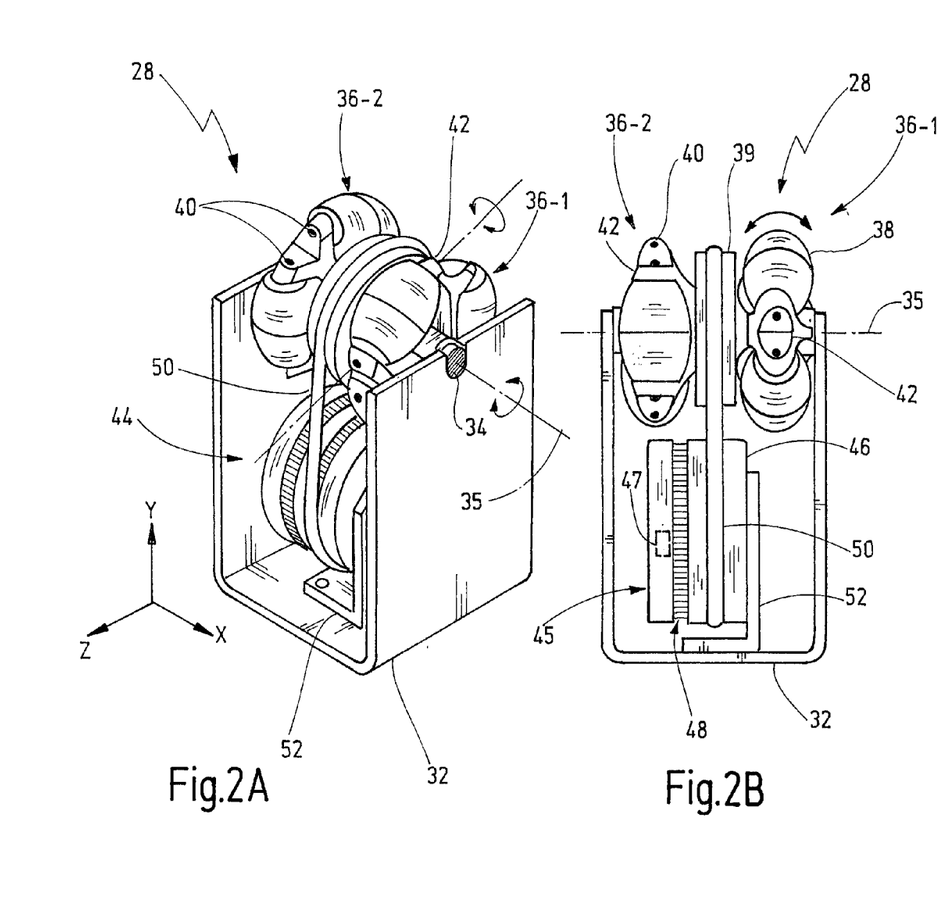
FIG. 2A-C shows a perspective view (FIG. 2A), a front view (FIG. 2B) and a side view (FIG. 2C) of a roller module of FIG. 1.
Figure 2C:
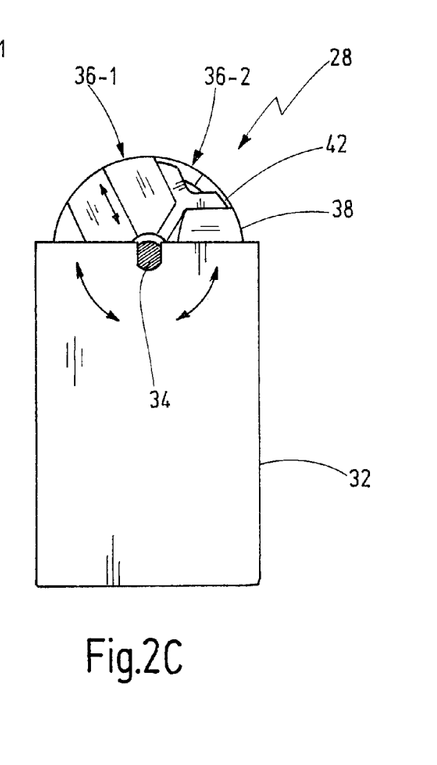

FIG. 2 shows the roller module 28 of FIG. 1 in greater detail. FIG. 2A shows the roller module 28 in a bird's-eye view. FIG. 2B shows a front view, and FIG. 2C shows a side view.

In this case, the roller module 28 comprises a support element or a support 32, which exemplarily has the shape of a "U", being suitable for receiving a shaft 34 which can be rotated about a rotation axis 35 in both directions of rotation. One or more all-side wheels 36 are arranged on the shaft 34 in a rotationally fixed manner. Two all-side wheels 36-1 and 36-2 are arranged in a neighbouring manner in FIG. 2. The structure of the all-side wheels 36 is described in more detail in the document U.S. Pat. No. 6,340,083 B1, which is incorporated by reference with regard to this aspect. A connecting wheel 39 is arranged between the all-side wheels 36-1 and 36-2.

In the present case, the all-side wheels 36 respectively comprise three roller bodies 38, which in turn are supported rotationally about roller shafts 40 in a bearing body 42, which in turn is mounted on the shaft 34 in a rotationally fixed manner. The roller bodies 38 of the neighbouring all-side wheels 36 are, preferably, arranged relatively to each other so that always one of the roller bodies 38 is in the vertex of the roller module 28. The contours of the roller bodies 38 are preferably formed such that a circle is formed in terms of an envelope (cf. FIG. 2C).

Further, each of the roller modules 28 comprises a drive unit 44 such as an electric motor 45 which in the present case is integrated into a housing 46 having a circulating recess 48, the housing being exemplarily formed in shape of a wheel. Also, a (subordinated) module control 47 can be integrated into the housing 46. The motor 45 is connected to the connecting wheel 39, for example, by means of a traction device 50 (such as round belts) for driving the all-side wheels 36-1 and 36-2. The connecting wheel 39 is also connected to the shaft 34 in a rotationally fixed manner. In this manner, it is possible to move one of the conveying goods standing on the roller module 28 in a longitudinal direction (direction Z), whereas the conveying good can slide along a transverse direction (direction X) over the roller module 28 almost without any friction. This is indicated in FIG. 2B by means of a double arrow above the right roller body 38.

In the present case, each of the roller bodies 38 covers an angle of about 60° so that three roller bodies 38 of each of the all-side wheel 36 form a full circle. It is clear that the all-side wheels 36 can be provided with more roller bodies 38 for each of the all-side wheel 36. Also, the traction device 50 can be replaced, for example, by means of a gear drive. The orientation of the all-side wheels 36 in the plane YZ can also be modified. Also, the all-side wheels 36 can be arranged at an angle relative to the plane YZ.

In the present case, the drive unit 44 is fixed to the support 32 by means of a separate drive support 52. However, the drive unit 44 could also be fixed directly to the support 32.

Figure 3:
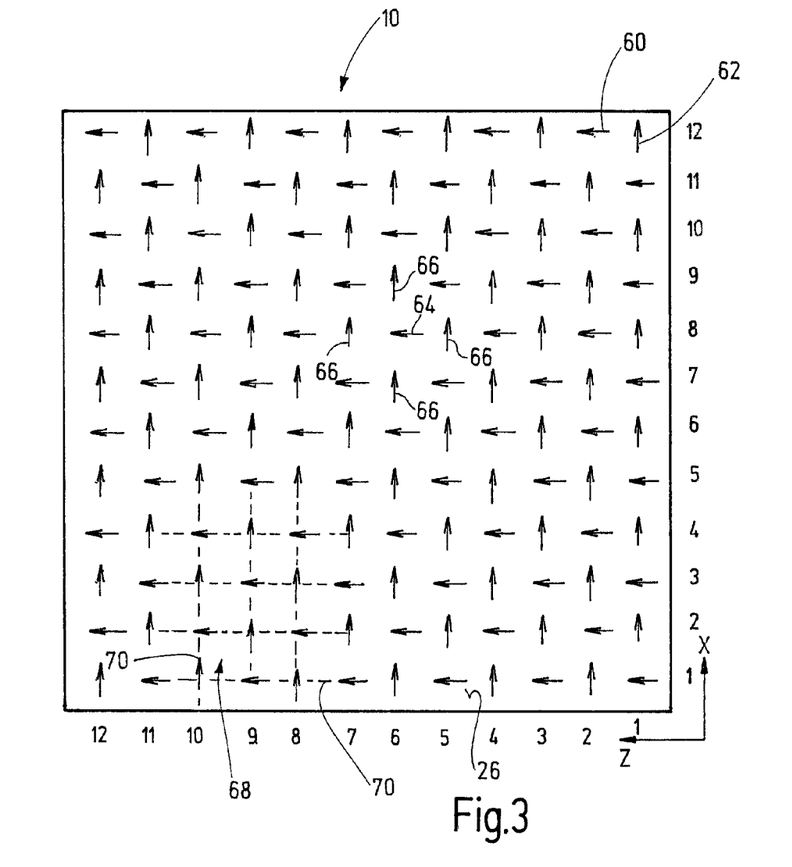
FIG. 3 shows a top view of a schematically illustrated matrix conveyor in accordance with the present invention.

With reference to FIG. 3 the matrix conveyor 10 of FIG. 1 is shown in a schematic top view, wherein the 144 (12×12) roller modules 28 are shown in the top side 26 of the matrix conveyor 10. Each of the roller modules 28 is indicated in terms of an arrow 60 or 62, which in turn represent two basic conveying directions being oriented perpendicular to each other.

An exemplary central roller module 64 is picked out close to the center of the array or roller modules, the central roller module 64 being surrounded by four direct neighbours 66. A direct neighbour 66 is to be understood hereinafter as one of the roller modules 28, which has the shortest distance relative to the central roller module 64. It is clear that each arbitrary one of the roller modules 28 of the 144 exemplary roller modules 28 of FIG. 3 could have been picked out for illustrating this type of arrangement.

The central roller module 64 has the coordinates X=8 and Z=6. The four direct roller module neighbours 66 have the coordinates (X=7, Z=6), (X=8, Z=5), (X=9, Z=6) and (X=8, Z=7).

Further, a grid-like structure 68 is indicated by means of imaginary lines 70 in the left lower region of the matrix conveyor 10 of FIG. 3, the imaginary lines 70 being oriented in parallel to the direction X and the direction Z. In the present case, a regular grid is shown. It is clear that the grid distances along the direction X can be selected different relative to the grid distances along the direction Z. In principle, the arrangement structure of each matrix conveyor 10 in accordance with the present invention can be reduced to such a grid-like structure, as will be described below with reference to FIG. 11.

Figure 4:
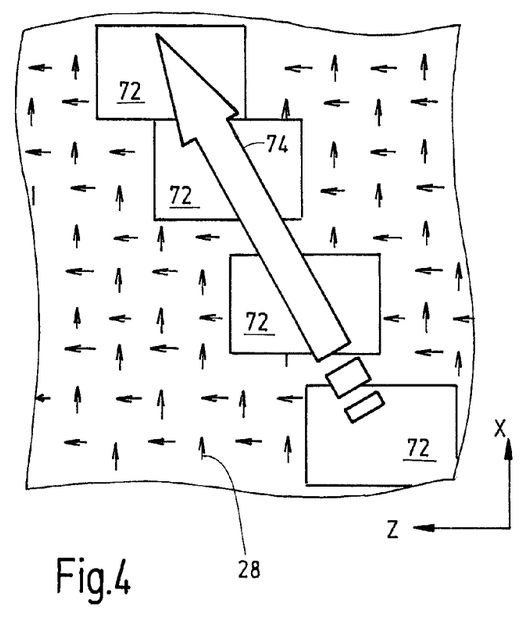
FIG. 4 shows a section of FIG. 3 for illustrating an oblique conveying movement of one of the conveying goods.

With reference to FIG. 4 an exemplary oblique travel of one of the conveying goods 72 over the matrix conveyor 10 of FIG. 3 is shown, wherein the matrix conveyer 10 in FIG. 4 is only illustrated partially.

The conveying path 74 associated with the oblique travel is illustrated in terms of an arrow. For this purpose, all of the roller modules 28 are driven positively (negative drive means backward run). The velocities at which the individual roller modules 28 are operated can be adjusted steplessly, wherein each of the roller modules 28 can be controlled individually.

Figure 5:
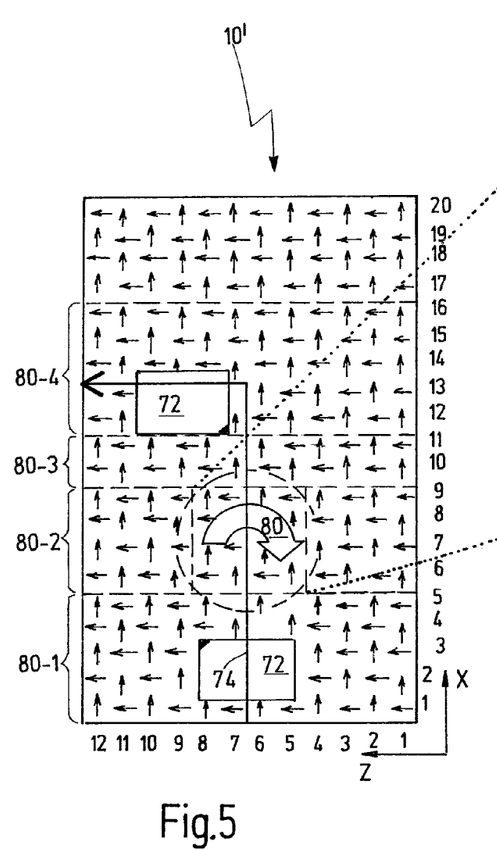
FIG. 5 shows a top view of another schematically illustrated matrix conveyor in accordance with the present invention for illustrating different functions.

FIG. 5 shows a top view of another matrix conveyor 10' as a schematic top view, wherein the matrix conveyor 10' in this case comprises twenty rows and twelve columns.

The conveying path 74 of the conveying good 72 is illustrated in terms of an arrow which is oriented upwards and angled about 90° to the left. One corner of the conveying good 72 is marked with a dark triangle for illustrating the orientation of the conveying good 72.

The matrix conveyor 10' can be divided in the direction X into four conveying sections 80-1 to 80-4 for facilitating the explanation below, which allows better explanation of the different modes of operation of the matrix conveyor 10' in the context of the conveying path 74.

The conveying good 72 is transported straight along the positive direction X in the first section 80-1. For this purpose, such roller modules 28 are driven positively which are located beneath the conveying good 72 during the travel along the path 74 and which are oriented, in terms of the basic conveying direction, parallel relative to the direction X. The remaining roller modules 28, which are passed by the conveying good 72 during the straight travel, are oriented along the second basic conveying direction, i.e., parallel relative to the direction Z, and are not driven. Nevertheless, this does not disturb the travel of the conveying good 72 in the positive direction X since the roller modules 28 being oriented in the direction Z comprise roller bodies 38 which rotate idly in the direction X.

The conveying good 72 is rotated about 180° in the section 80-2, as will be explained below with reference to FIG. 6.

A short conveyance straight on along the positive direction X happens, in turn, in the section 80-3, and the conveying good is discharged in the section 80-4 after the short conveyance straight on. Then, if the conveying good 72 moves outwardly to the left in FIG. 5, only such roller modules 28 are driven which have all-side wheels 36 in parallel to the direction Z. The conveying good 72 slides over the other roller modules 28 due to the idle-rotating roller bodies 38 of these roller modules 28.

Hence, the path 74 of FIG. 5 represents exemplarily the following functions: conveying straight ahead, orientating, rotating during a straight-ahead travel, and discharging.

Figure 6:
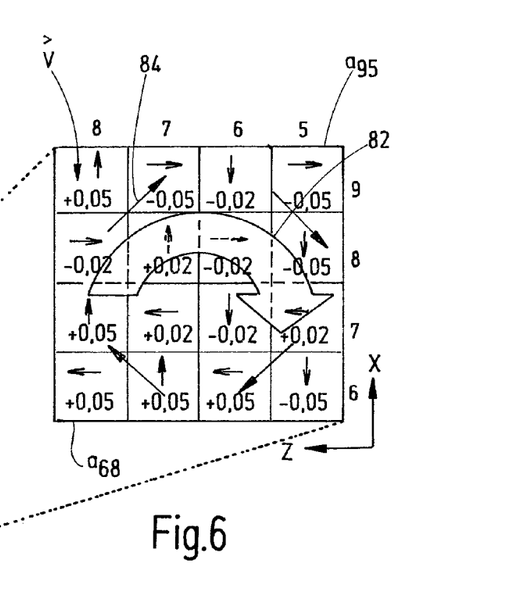
FIG. 6 shows a magnified view of a section of FIG. 5 for illustrating a rotational movement.

With reference to FIG. 6 part of the second section 80-2 is illustrated in an enlarged manner for explaining rotational movement at one and the same spot.

If the conveying good 72 has arrived exactly in the center of the roller module array of FIG. 6, the individual roller modules ($a_{65}$ to $a_{98}$) can be operated at velocities like they are exemplarily inserted in the boxes of FIG. 6 in terms of positive and negative numbers, wherein the boxes are only shown for facilitating an illustration. If the roller modules 28 of FIG. 6 are operated at the indicated velocities and in the indicated directions, the conveying good 72 can be rotated at one and the same spot about 180°. This is indicated in terms of a rotation arrow 82. Individual movement directions of subgroups of arrays of roller modules, which result therefrom, are indicated by means of arrows 84. It is clear that this rotation can be overlapped with a straight-ahead travel along the positive direction X.

Figure 7:
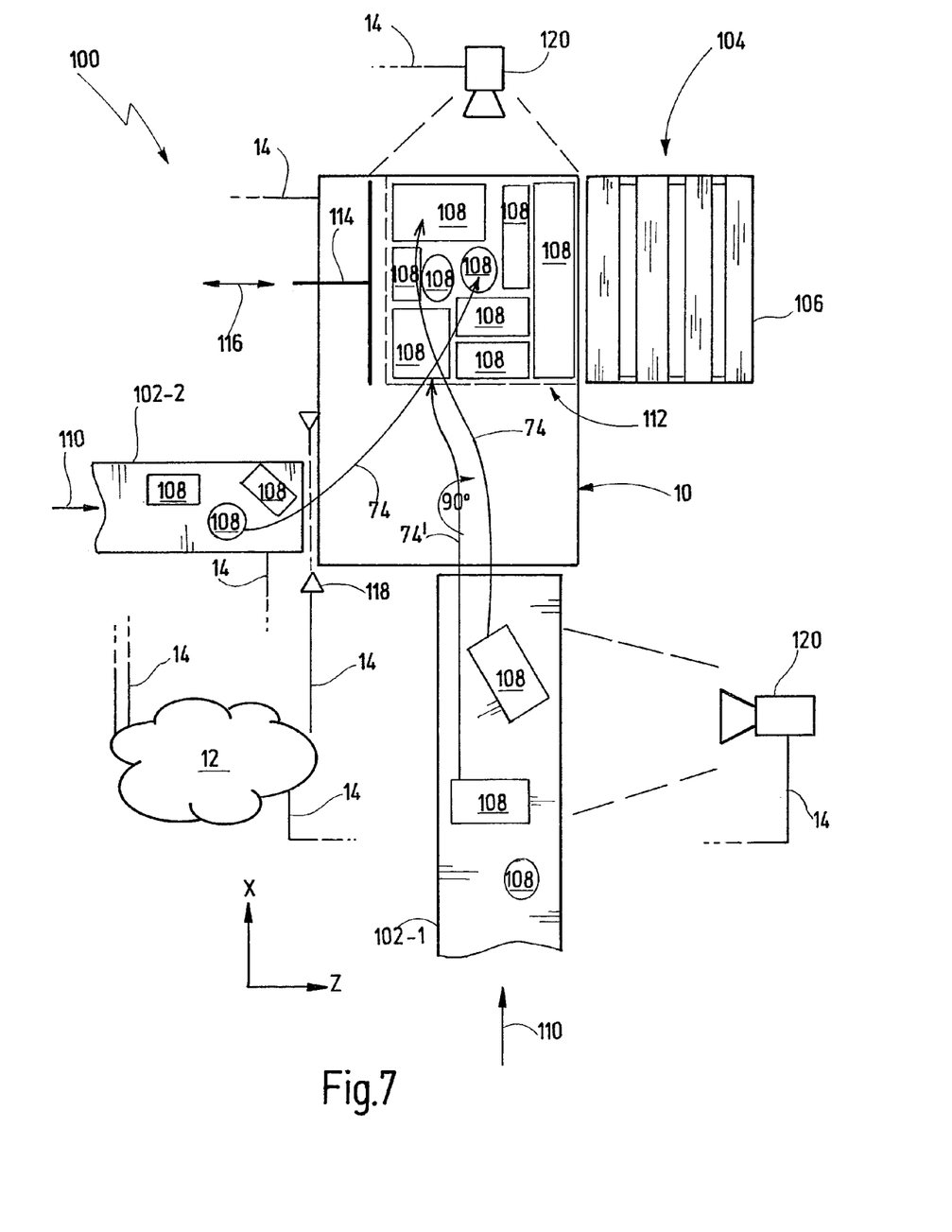
FIG. 7 shows a top view of a palletizing device in accordance with the present invention.

With reference to FIG. 7 a top view of a palletizing device 100 in accordance with the present invention is shown.

The palletizing device 100 comprises a matrix conveyor 10 in accordance with the present invention, the matrix conveyor 10 being only indicated schematically. For example, two feeding conveyors 102-1 and 102-2 are coupled in a conveying manner to the matrix conveyor 10. It is clear that more or less feeding conveyors 102 can be provided.

Further, a loading station 104 is arranged adjacent to the matrix conveyor 10 so that one layer of loading goods 108, all of which can have different dimensions, can be transferred to a provided load carrier 106, such as a Europool pallet or the like. One layer of loading goods 108 can be collected in a layer region 112. The layer region 112 is shown by means of broken lines in FIG. 7. As soon as one layer of loading goods 108 has been collected completely, the layer can be transferred to the load carrier 106 by means of a transferring device 114 which, however, returns subsequently as indicated exemplarily by means of a double arrow 116. The transferring device 114 can be implemented, for example, by a pusher being arranged laterally. Of course, one completely collected layer of loading goods 108 can also be pushed simply on the load carrier 106 by the matrix conveyor 10.

The superordinated control device 12 can be connected to one or more light barriers 118 for detecting the entry of a loading good 108 at the matrix conveyor 10.

Alternatively or additionally one of more image detecting systems 120, such as cameras, can be provided for getting delivered information on the current states of the entire system at any time. The superordinated control device 12 can calculate in real time changing commands for the roller modules 28 based on this information for adapting a deviating actual position to a set position. The conveying goods only move along planned-in-advance paths (set positions) without corresponding corrections.

Figure 8:
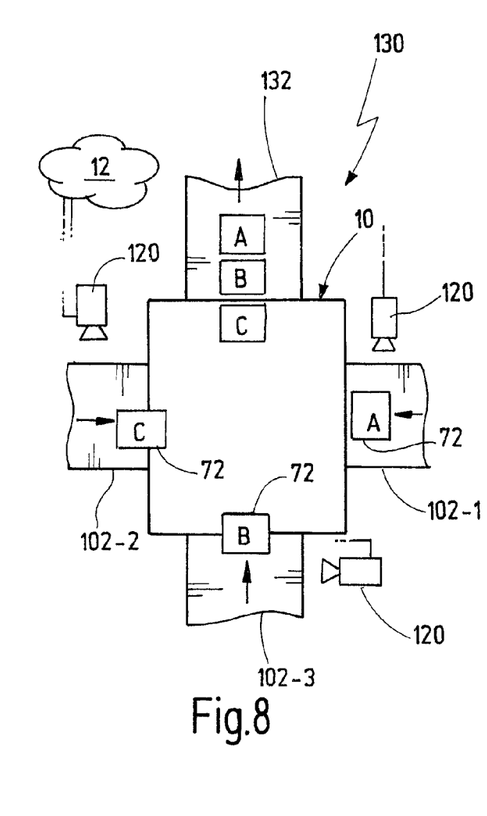
FIG. 8 shows a top view of a matrix conveyor in accordance with the present invention which collects, positions, and orientates a number of conveying goods.

With reference to FIG. 8 a matrix conveyor 10 in accordance with the present invention is used as a sorting device 130 shown in a schematic top view. The matrix conveyor 10 is arranged adjacent to, for example, three feeding conveyors 102-1 through 102-3, which in the present case respectively deliver one conveying good 72. The matrix conveyor 10 expects these conveying goods 72 either for bringing them into the sequence, as shown in the upper part of FIG. 8 (A-B-C), along planned-in-advance paths (trajectories) or for retrieving again the conveying goods 72 via a discharging conveyor 132.

Alternatively, the state of the system 130 can be monitored by means of one or more cameras 120 delivering data so that the superordinated control device 12 can correct paths planned in advance or obtaining the situation illustrated in the upper region of FIG. 8.

Figure 9:
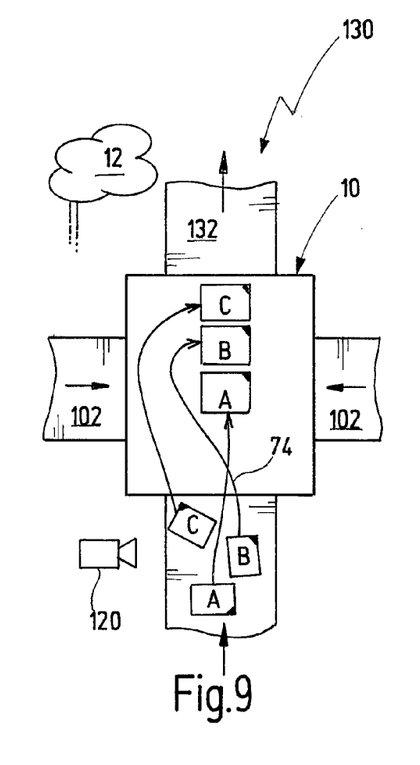
FIG. 9 shows a top view of a matrix conveyor in accordance with the present invention which sorts and orientates a number of conveying goods.

FIG. 9 shows the sorting device 130 of FIG. 8 as used for orientating the conveying goods 72, as shown for illustrative purposes by means of a respective dark corner in the conveying goods 72.

Figure 10:
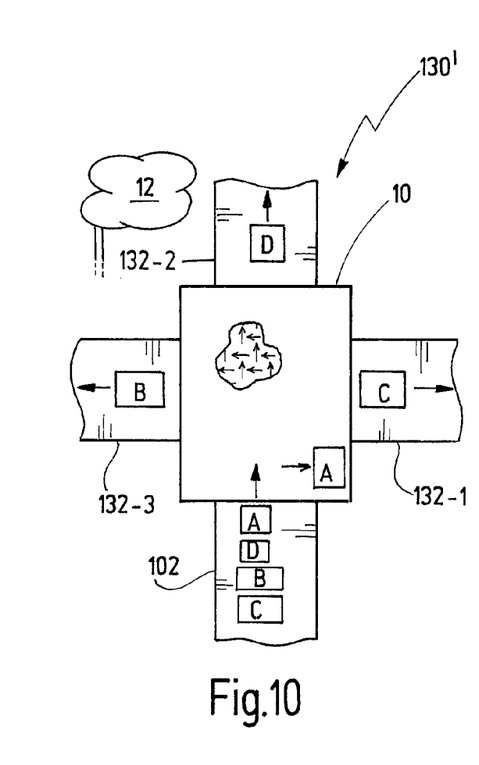
FIG. 10 shows a top view of a matrix conveyor in accordance with the present invention distributing a number of conveying goods.

FIG. 10 illustrates a distributing device 130'. In this case, the feeding conveyors 102 feed four for conveying goods A to D in the sequences A, D, B, C to the matrix conveyor 10. The matrix conveyor 10 distributes the conveying good C to the discharging conveyor 132-1, the conveying good D to the discharging conveyor 132-2, and the conveying good B to the discharging conveyor 132-3. The conveying good A is buffered, for example, in the lower right corner of the matrix conveyor 10 until the conveyor good A is required and then delivered to one of the discharging conveyors 132.

Figure 11:
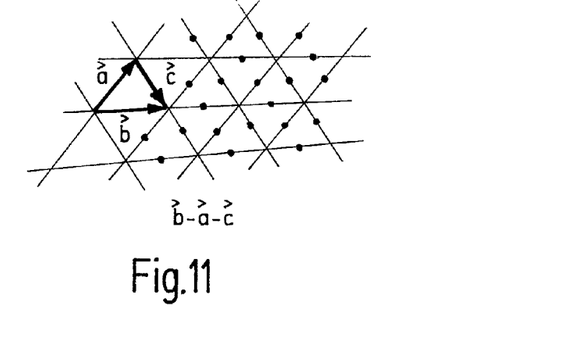
FIG. 11 shows an alternative embodiment including three basic conveying directions.

With reference to FIG. 11 an alternative arrangement of roller modules 28 is shown, wherein the roller modules 28 are oriented along three basic conveying directions. The basic conveying directions can map, for example, an equilateral triangle. The centers of the sides in turn are arranged along a regular grid.

Therefore, what we claim is:

1. A matrix conveyor comprising:
a regular grid-shaped structure have a plurality of points of intersections;
a plurality of individual roller modules, wherein respectively one of the individual roller module is arranged at each of the points of intersection of the regular grid-shaped structure, and wherein the individual roller modules commonly define a conveying plane, which is substantially planar, for trans-porting conveying goods thereon; and
a control device being adapted to individually control each of the individual roller modules so that the conveying goods are transported along a path, which is planned in advance, wherein a shape of the path is defined by a plurality of overlaps of at least two basic conveying directions geometrically spanning the conveying plane;
wherein each of the individual roller modules has at least one all-side wheel and is drivable in only one of the at least two basic conveying directions, wherein directly adjacent ones of the individual roller modules are respectively drivable in another one of the at least two basic conveying directions.

2. The matrix conveyor of claim 1, further comprising a frame, wherein each of the individual roller modules is arranged in a rotationally fixed manner relative to the frame.

3. The matrix conveyor of claim 1, wherein each of the individual roller modules comprises a separate drive unit.

4. The matrix conveyor of claim 3, wherein each of the individual roller modules comprises a separate module-control device.

5. The matrix conveyor of claim 1, wherein the control device is adapted to control the individual roller modules by means of a control matrix comprising matrix elements, wherein each of the individual roller modules has assigned one of the matrix elements of the control matrix, and wherein each of the matrix elements is determined uniquely by means of at least one of: a location of the respectively assigned one of the individual roller modules arranged in the grid-shaped structure, a conveying velocity, an acceleration, a lift, and time.

6. The matrix conveyor of claim 5, wherein each of the individual roller modules has assigned only one of the matrix elements.

7. The matrix conveyor of claim 1, wherein a conveying velocity of each of the individual roller modules is adjustable steplessly and in a temporal changeable manner.

8. The matrix conveyor claim 1, wherein exactly two basic conveying directions are spanning the conveying plane.

9. The matrix conveyor of claim 8, wherein the exactly two basic conveying directions are orientated perpendicularly to each other, so that the individual roller modules are arranged and operable along a regular rectangular grid.

10. The matrix conveyor of claim 1, wherein each of the individual roller modules is of an identical type.

11. The matrix conveyor of claim 1, wherein each of the roller modules comprises at least one of: the at least one all-side wheel, a drive unit, a shaft, a force transmission unit, and a support.

12. A palletizing device for stacking loading goods on a load carrier, wherein the loading goods may have respectively different dimensions and may be formed differently, comprising:
a matrix conveyor which comprises:
a regular grid-shaped structure have a plurality of points of intersections;
a plurality of individual roller modules, wherein respectively one of the individual roller module is arranged at each of the points of intersection of the regular grid-shaped structure, and wherein the individual roller modules commonly define a conveying plane, which is substantially planar, for transporting conveying goods thereon; and
a control device being adapted to individually control each of the individual roller modules so that the conveying goods are trans-ported along a path, which is planned in advance, wherein a shape of the path is defined by a plurality of overlaps of at least two basic conveying directions geometrically spanning the conveying plane;
wherein each of the individual roller modules has at least one all-side wheel and is drivable in only one of the at least two basic conveying directions, wherein directly adjacent ones of the individual roller modules are respectively drivable in the other one of the at least two basic conveying directions;
one or more feeding conveyors, wherein each of the feeding conveyors is connected in a conveying manner to the matrix conveyor; and
a loading station being arranged laterally adjacent to one side of the matrix conveyor so that the loading goods, which have been collected on the matrix conveyor for forming one layer, are transferred to a provided load carrier;
wherein the control device of the matrix conveyor is adapted to transport each of the loading goods from one of the feeding conveyors along the path, being specifically planned in advance, to a destination, which has been planned in advance, within the layer.

13. The palletizing device of claim 12, wherein the control device of the matrix conveyor additionally rotates loading goods about an axis being oriented perpendicular relative to the conveying plane, while the loading goods are moved at the same time along the path being planned in advance to a location being planned in advance.

14. The palletizing device of claim 12, wherein the conveying plane of the matrix conveyor is greater than a loading area of the load carrier to be loaded.

15. A matrix conveyor comprising:
a regular grid-shaped structure have a plurality of points of intersections;
a plurality of individual roller modules, wherein respectively one of the individual roller module is arranged at each of the points of intersection of the regular grid-shaped structure, and wherein the individual roller modules commonly define a conveying plane, which is substantially planar, for trans-porting conveying goods thereon; and
a control device being adapted to individually control each of the individual roller modules so that the conveying goods are transported along a path, which is planned in advance, wherein a shape of the path is defined by a plurality of overlaps of at least two basic conveying directions geometrically spanning the conveying plane;
wherein each of the individual roller modules is drivable in only one of the at least two basic conveying directions, wherein directly adjacent ones of the individual roller modules are respectively drivable in the other one of the at least two basic conveying directions.

* * * * *